July 7, 1970 G. W. GILLEMOT 3,519,728
PROTECTIVE ENCLOSURE FOR CABLES
Filed May 16, 1968
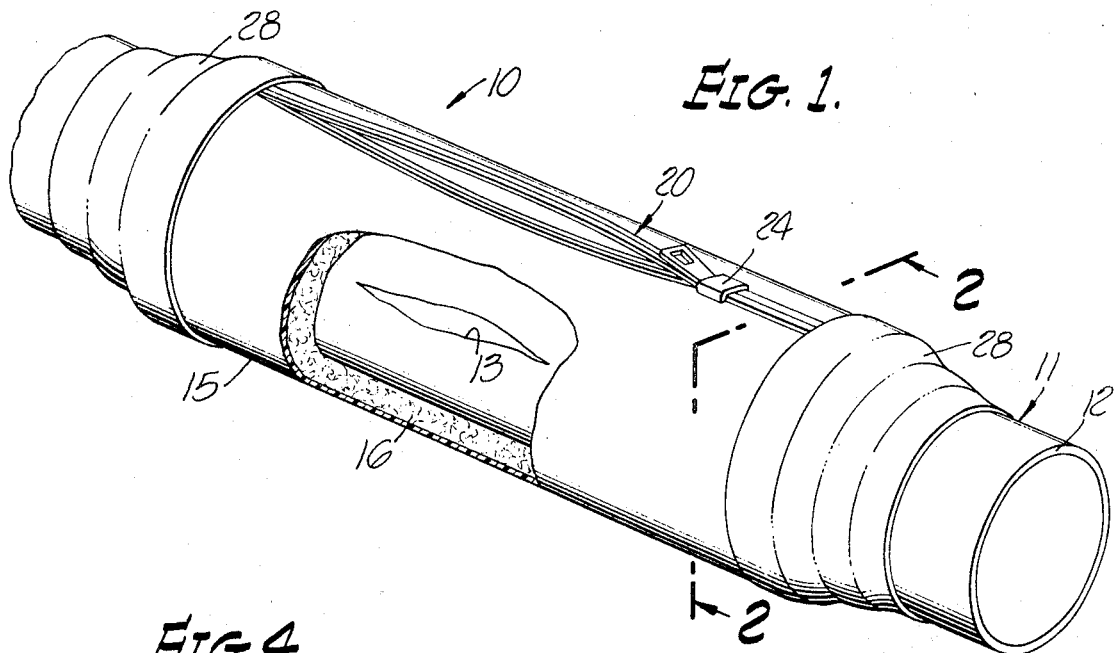
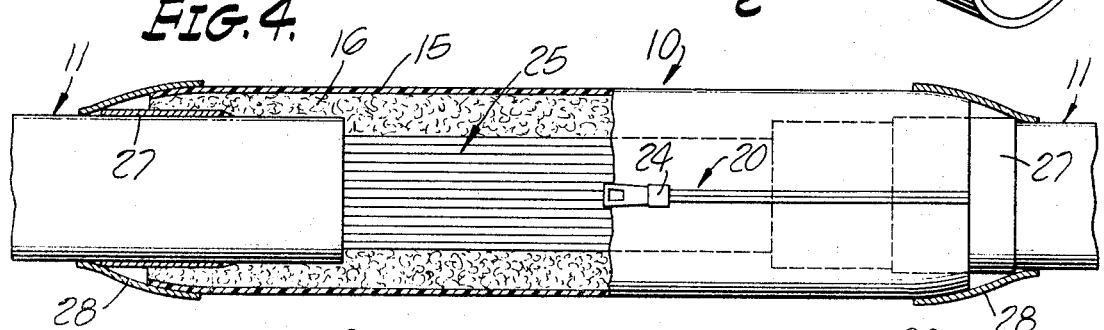
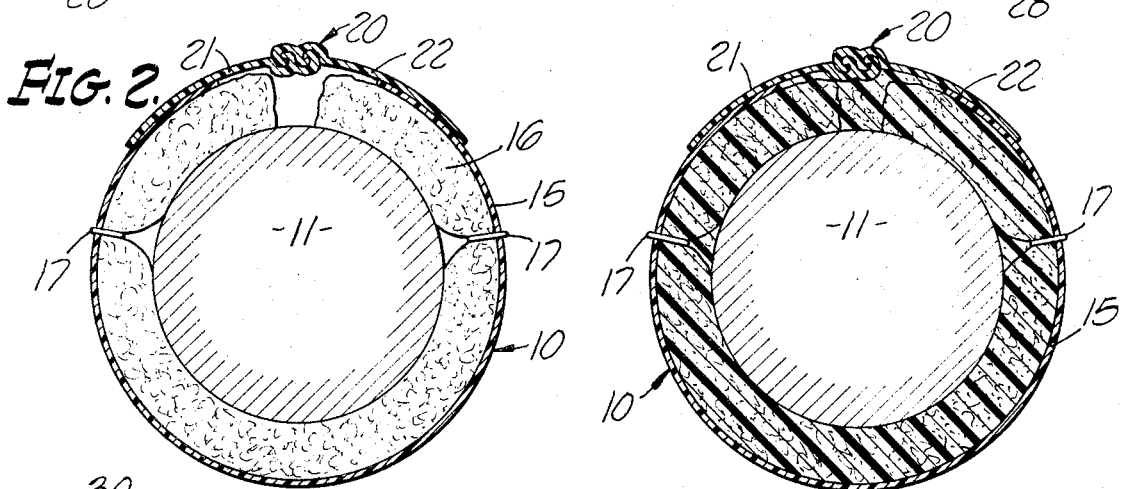
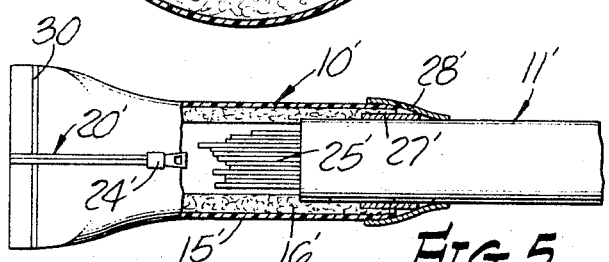
INVENTOR
GEORGE W. GILLEMOT
BY
ATTORNEYS United States Patent Office 3,519,728
Patented July 7, 1970

3,519,728
PROTECTIVE ENCLOSURE FOR CABLES
George W. Gillemot, Venice, Calif., assignor to
Walter A. Plummer, Sherman Oaks, Calif.
Filed May 16, 1968, Ser. No. 729,770
Int. Cl. H02g 15/04, 15/18
U.S. Cl. 174—76                                2 Claims

ABSTRACT OF THE DISCLOSURE

A protective enclosure for cables and a method of applying the same comprising a tubular boot having a thin walled flexible impervious main body lined with thick porous spongy material. After assembling the enclosure about a length of cable and sealing the ends, the spongy material is charged with a fluid potting compound which solidifies and seals against all contacting surfaces to provide a fluidtight protective enclosure for either the end or a midlength portion of cabling or the like.

---

This invention relates to tubular jackets and more particularly to an improved tubular enclosure for use about cables and the like objects.

There has been proposed heretofore various expedients for enclosing the ends of a splice between cable conductors but these proposals are subject to various shortcomings and disadvantages sought to be avoided by the present invention. Also, it not infrequently happens that cable sheathing is injured or broken. Owing to the lack of satisfactory repair techniques it has been necessary to remove the damaged section to splice in a new section. This is a costly and time-consuming operation.

By the present invention there is provided a simple, inexpensive protective enclosure which can be easily applied in a wide variety of modes by relatively unskilled operators thereby continuing the injured cable in service and avoiding the need for splicing in a new section. The invention enclosure is not only compact and light in weight, but it greatly strengthens the injured sheathing and is equally suitable for use to enclose and protect exposed terminals and spliced conductors. The protective enclosure is foolproof, fluidtight and will withstand rough handling and severe service conditions.

According to one preferred embodiment, the protective enclosure comprises a thin, flexible-walled main body lined on its interior with a thick, porous, spongy material, effective when assembled about the cable, to hold the outer cover fully extended and uniformly spaced from the cable sheath. The enclosure is preferably provided with a seam to hold the parts snugly embraced about the cable and after sealing the ends to the sheath, fluid potting compound is charged into the spongy material until the air is driven out and the voids are substantially filled with the compound. During this charging operation the spongy material holds the jacket uniformly and concentrically spaced about the exterior of the cable. As the compound solidifies it forms a seal with all surfaces in contact therewith and forms a strong, fluidtight protective enclosure for the cable.

Accordingly, it is a primary object of the present invention to provide an improved protective enclosure for cabling and a simplified method of enclosing conductors or a splice or a damaged portion of cabling.

Another object of the invention is the provision of an inexpensive, laminated enclosure adapted to be telescoped over or wrapped about a section of cable to be protected and charged with potting compound solidifying into a mechanically strong fluid-tight layer surrounding a cable section.

Another object of the invention is the provision of a longitudinally split, laminated wrapping for cabling featuring an open-pored spongy lining adapted to be charged with potting compound after the enclosure has been assembled about cabling.

Another object of the invention is the provision of an open-ended boot having a thick, spongy lining adapted to be telescoped over the end of cable and sealed thereabout with a charge of solidifiable potting compound.

These and other more specific objects will appear upon reading the following specification and claims and upon considering in connection therewith the attached drawing to which they relate.

Referring now to the drawing in which a preferred embodiment of the invention is illustrated.

FIG. 1 is a fragmentary view in perspective of the one preferred embodiment of the invention in semi-assembled condition with a portion of the protective enclosure broken away to show interior constructional details;

FIG. 2 is a cross-sectional view on an enlarged scale taken along line 2—2 on FIG. 1;

FIG. 3 is a view similar to FIG. 2 but showing the enclosure charged with potting compound;

FIG. 4 is a longitudinal view of the enclosure boot applied about a cable splice with a portion of the enclosure broken away to show interior details prior to charging with potting compound; and FIG. 5 is a side view of a modified enclosure construction assembled about the end of a cable with parts of the enclosure broken away and prior to charging with potting compound.

Referring more particularly initially to FIG. 1, there is shown one preferred embodiment of the invention enclosure assembly, designated generally 10, assembled about an intermediate portion of a multiple conductor cable, the sheath 12 of which has been damaged as indicated at 13. Normally damage of this character would necessitate replacing the injured section with a new length of cable.

Enclosure 10 comprises a unitary jacket having an outer main body 15 formed of suitable, flexible, supple impervious elastomeric material as, for example, polyvinyl chloride, polyethylene or similar abrasion resistant nonconductive material.

Suitably secured against its interior surface is a thick layer of open-pored spongy resilient material 16. This material may be bonded to main body 15 or secured thereto by one or more rows of stitching 17. Desirably, layer 16 is sufficiently wide to substantially fully encircle cable 11. Outer layer 15 is preferably provided with a suitable seam closure 20. As herein shown, this seam comprises a pair of extruded plastic seam-forming tapes 21, 22 formed along their free edges with oppositely facing interlocking tongues and grooves adapted to interlock when pressed together manually or by the aid of a slider device 24.

The described enclosure is applied about a damaged area 13 or over the spliced ends of cable conductors 25 (FIG. 4) as follows. The operator serves the cable sheath with one or more layers of a thick, tacky tape 27 to either side of the damaged area 13 or of the spliced cable conductors 25, Buna sealing tape well known to workers in the cable art being admirably suited for this purpose. The next step is to select a jacket 10 of appropriate size to fit the cable being repaired snugly. Closure seam 20 having been opened for its full length, the jacket is wrapped about the cable so as to leave about one-half of the width of the tacky tape 27 exposed beyond either end of the jacket. The enclosure is held in assembled position in part by the affinity of the spongy material 16 for the tacky tape and in part by the closing of the seam by manipulation slider 24 or, if such slider is not present, by manually pressing the seam-forming grooves into interlocking engagement. If the last-mentioned method of closing the seam is employed, then it is preferable to leave the midportion of the seam open as is indicated in FIG. 1. The opposite ends of the enclosing jacket are served with wrappings of adhesive tape 28 effective to seal the exposed ends of the spongy material and to provide a neat, finished appearance at the opposite ends of the enclosure.

The final operation is to fill the cavity inside the jacket with a suitable potting compound, a fluid epoxy-type compound well known to those in the electrical arts being particularly satisfactory. Owing to the large open pores of spongy material 16, this compound readily fills all voids and cavities inside the enclosure as the air escapes through the partially open seam. During the charging operation manipulating pressure may be applied to different parts of the enclosure to aid in the flow of the potting compound to all portions and to facilitate the escape of any trapped air. A skilled operator will readily note any air pockets because of the easily detected difference in the sponginess of air pockets compared to space filled with compound. After making certain that the entire cavity is fully charged, seam 20 is closed and the compound is permitted to solidify. Some compounds are of the thermosetting type and the application of heat may expedite curing and setting. In setting, the compound forms a strong, tenacious bond with all surfaces in contact with the compound with the result that the entire assembly is firmly and inseparably bonded to the cable and all interior parts of the enclosure assembly. In consequence the cable conductors are not only heavily insulated but have stronger and thicker protection than that provided by the cable sheath itself.

An alternate type of tubular enclosure or boot is shown in FIG. 5 the same or similar parts being designated the same reference characters distinguished by a prime. As there shown, enclosure 10' is open only at one end, its other end being flattened and bonded or heat sealed closed as indicated at 30.

Enclosure assembly 10' is telescoped over the end of the cable by opening slider 24'. Tacky tape 27' is applied in the same manner described above following which the open and expanded jacket is applied about the end of the cable leaving a narrow band of the tacky tape 27' exposed. One or more servings of adhesive tape 28' are then applied in the same manner as described above. Thereafter, potting compound is charged into the interior of the enclosure through the open seam, the slider being gradually closed as the charging operation progresses. After the operator is certain that all air has been released and that the cavity is fully charged with compound, the seam is closed and the compound allowed to set and solidify.

While the particular protective enclosure for cables herein shown and disclosed in detail is fully capable of attaining the objects and providing the advantages hereinbefore stated, it is to be understood that it is merely illustrative of the presently preferred embodiments of the invention.

I claim:

1. In combination with the terminal end of a cable of conductors, a fluidtight protective enclosure telescoped over the end of said cable comprising an elongated tubular boot of flexible impervious sheet material having an opening only at one end, a thick spongy lining along the interior wall of said boot embracing a portion of the cable sheath to hold said flexible sheet material extended and spaced outwardly from the sheath, said boot having interlocking seam-forming means extending lengthwise of the open end thereof adapted to be opened to facilitate assembly of the boot about said cable and adapted to be closed thereafter to hold said spongy lining snugly wrapped about said cable end, and a charge of solidified potting compound filling said boot and sealing the same about the terminal end of said cable end.

2. The combination defined in claim 1 characterized in that one end of said tubular boot is flattened and sealed closed.

References Cited

UNITED STATES PATENTS

| 2,708,123 | 5/1955 | Risley et al. | 285—45 |
| 2,756,172 | 7/1956 | Kidd | 138—128 X |
| 3,038,558 | 6/1962 | Plummer. | |
| 3,187,090 | 6/1965 | Edwards | 174—138.4 |
| 3,283,059 | 11/1966 | Plummer | 174—138.4 X |
| 3,419,669 | 12/1968 | Dienes | 174—76 X |
| 2,115,307 | 4/1938 | Kneeter | 150—52.6 |

FOREIGN PATENTS 1,502,737  10/1967  France.

LARAMIE E. ASKIN, Primary Examiner

U.S. Cl. X.R.

174—84